Jan. 15, 1929.
R. H. WENTORF
1,698,929
COMBINED HANDLE AND COVER CLAMP FOR COOKING VESSELS
Filed Dec. 29, 1927
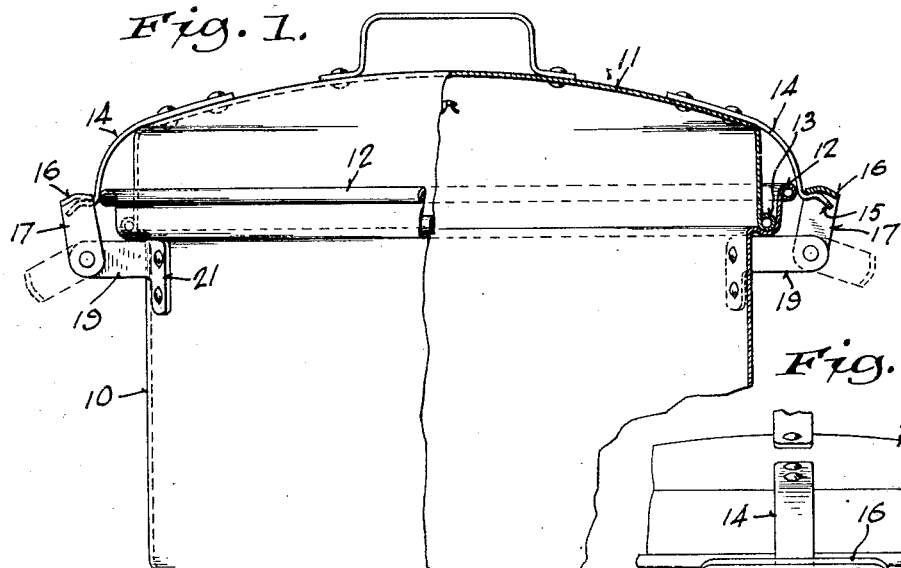
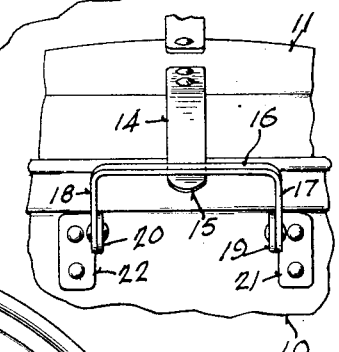
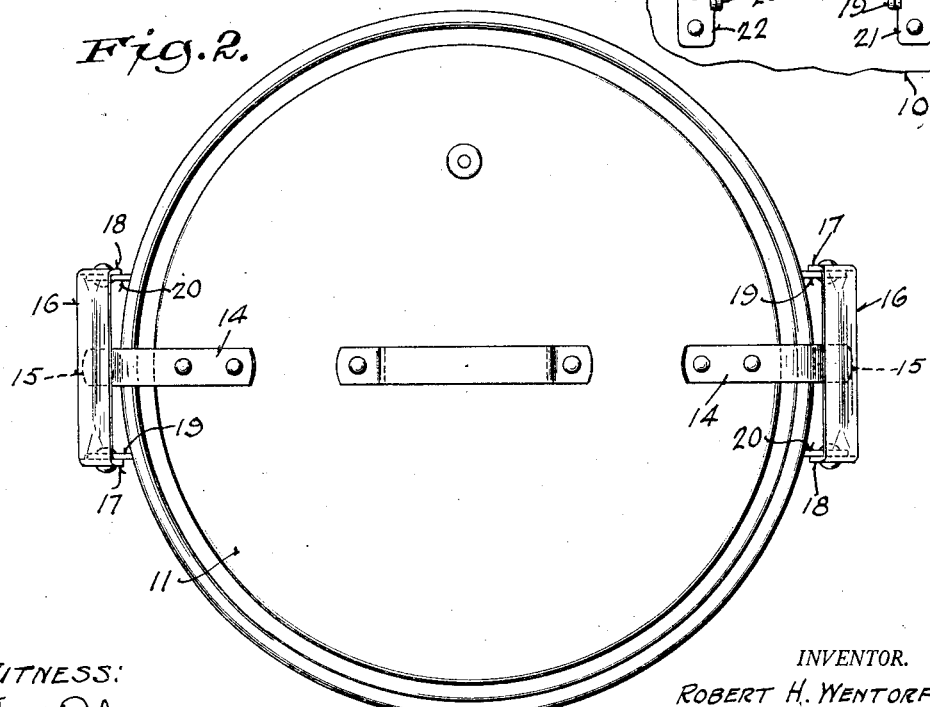
WITNESS:
Fred Palm
DEL.
INVENTOR.
ROBERT H. WENTORF
BY
Erwin, Wheeler & Woodard
ATTORNEYS.

Patented Jan. 15, 1929.

1,698,929

UNITED STATES PATENT OFFICE.

ROBERT H. WENTORF, OF WEST BEND, WISCONSIN, ASSIGNOR TO WEST BEND ALUMINUM COMPANY, OF WEST BEND, WISCONSIN, A CORPORATION OF WISCONSIN.

COMBINED HANDLE AND COVER CLAMP FOR COOKING VESSELS.

Application filed December 29, 1927. Serial No. 243,242.

The invention relates to a cooking vessel of the pressure type, and it resides in a vessel provided at opposite points upon its sides with handles by means of which the vessel may be lifted, the said handles having the further function of engaging with correspondingly located catches attached to the cover of the vessel, whereby the said cover may be clamped in its seat on the vessel, when the handles are engaged with the said catches.

The catches which are attached to the cover, extend outwardly therefrom a short distance, with their free ends in position to be engaged by the handles, when it is desired to secure the cover in position.

The handles are of peculiar construction, each being formed of a straight bar, provided at its ends with inturned parallel arms, which latter are pivoted at their free ends to the outer ends of lugs having feet which are attached to the vessel.

The pivoted members of the handles are adapted to be rotated so as to bring the bars thereof into engagement with the outwardly projecting ends of the catches, and firmly hold the cover in effective position upon the vessel.

The details of the invention will now be described, and the novelty thereof will be pointed out in the appended claims.

In the accompanying drawing:

Figure 1 is a view in elevation of a cooking vessel to which my invention has been applied, the view being broken out to show certain details of construction and arrangement, and illustrates the manner in which the clamping action is effected.

Fig. 2 is a plan view of the vessel with the cover in position thereon, and illustrates the engagement of the handles with the catches on the cover, looking from the top of the vessel.

Fig. 3 is a fragmentary view looking directly toward the clamp at one side of the vessel.

In the drawing, the numeral 10 indicates a cooking vessel, and the numeral 11 a cover therefor. At its top, the walls of the vessel are turned outwardly to form a circular ledge, and then turned upwardly, terminating in a bead 12, to give stability to the rim of the vessel.

The cover 11 is provided with a depending flange, the lower edge of which terminates in a bead 13, stabilizing the lower edge of the cover. When the cover 11 is positioned upon the vessel 12, the bead 13 on the cover is seated upon the circular ledge formed at the top of the vessel.

At opposite points on the cover 11, catches 14 are secured, the said catches being formed of metal strips, the free ends of which extend outwardly from the cover and downwardly for a short distance, and in position to be brought into engagement with the bead 12 at the top of the vessel. The said catches possess sufficient resiliency to cause them, although yielding under pressure, to return to and maintain normal positions. At their extreme ends, the catches are projected outwardly as at 15, into a substantially horizontal position, such extreme ends being bowed as shown in Fig. 1, for a purpose which later will be described.

At two opposite points on its sides, the vessel is provided with handles, whereby it may be lifted. The handles have a peculiar construction due to their function of co-operating with the catches before referred to, so as to clamp the cover upon the vessel. Each handle is formed of a straight bar 16, inturned at its ends to form parallel arms 17 and 18, the free ends of the latter being pivoted to lugs 19 and 20, extending from feet 21 and 22, which latter are attached to the vessel, just below the lower side of the ledge before described.

The bar 16 of the handle is curved transversely, as shown at the right of Fig. 1, so as to have a concaved under side, the concavity being adapted to receive the bowed portion of the outwardly projecting end 15 of the resilient catch 14.

When the cover 11 is placed upon the vessel, and the pivoted parts of the handles are turned from the dotted line positions shown in Fig. 1 to the full line positions, the bars 16 will be swung over the projecting ends 15 of the catches 14, and the cover will be firmly held in its seat. In such movement of the bars 16, the resiliency of the catches 14 will permit a slight deflection of the ends 15 under the pressure exerted in the movement of the bars 16 thereover, until the bowed portions 15 of the catches 14 enter the concavities in the bars 16. The frictional and interlocking engagement of the ends 15 of the catchs 14 with the concavities in the bars 16, augmented by the tension of the catches 14, will serve to prevent accidental disengagement of the parts. The cover 11 can be removed from the vessel only after a positive disengagement of the bar 16 of the handles, from the ends 15 of the catches 14.

Having thus described my invention, what I claim and desire to secure by Letters Patent of the United States, is:

1. A cooking utensil comprising a vessel and a cover therefor, the said cover having catches attached at opposite sides thereof and extending beyond the same, and opposite handles pivoted to the vessel and adapted to be turned to engage the said catches to clamp the cover in position upon the vessel.

2. A cooking utensil comprising a vessel having a ledge and a stabilizing bead at its rim and a cover adapted to be seated on the ledge, resilient catches attached to the cover at opposite points and projecting outwardly and downwardly to bear against the said bead, and handles pivoted to the vessel and adapted to be turned to engage the ends of the catches to clamp the cover upon the vessel.

3. A cooking utensil comprising a vessel and a cover therefor, resilient catches attached to the cover and extending downwardly and outwardly, the free ends of such catches being bowed, and handles pivoted to the vessel, the bars of the handles being concaved at their under sides, the concavities being adapted to receive the bowed portions of the resilient catches, whereby the cover is clamped in position upon the vessel.

4. A cooking utensil comprising a vessel and a removable cover therefor, resilient catches attached to the cover, and handles pivoted to the vessel and adapted to be turned to engage the said catches to clamp the cover in position upon the vessel.

In testimony whereof, I have signed my name at West Bend this 20th day of December, 1927.

ROBERT H. WENTORF.